May 23, 1939.　　　　J. T. VOORHEIS　　　　2,159,463
HEAT EXCHANGE APPARATUS
Filed March 24, 1936　　　　2 Sheets-Sheet 1
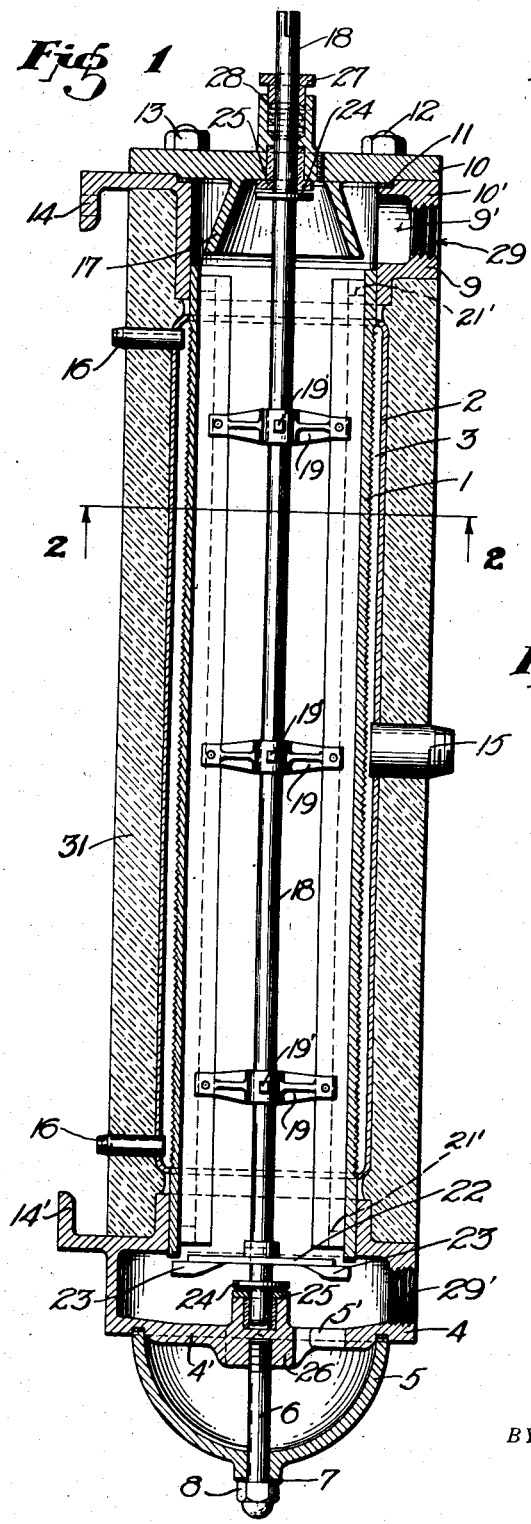
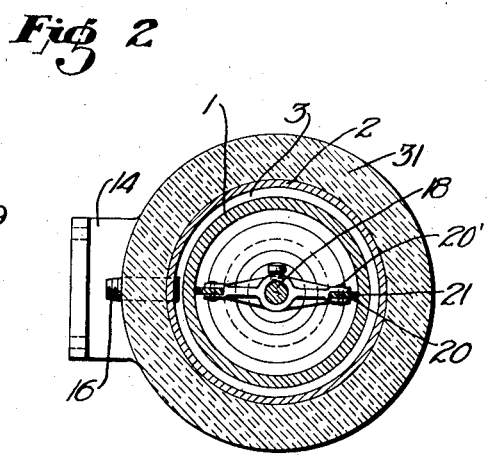
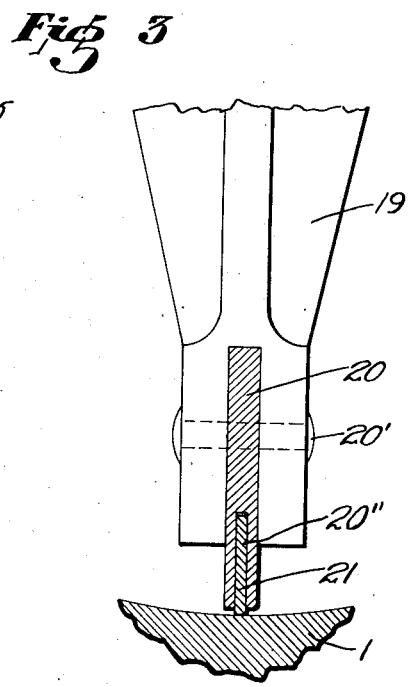
INVENTOR
JOSEPH T. VOORHEIS
BY James M. Abbett
ATTORNEY May 23, 1939.　　　　J. T. VOORHEIS　　　　2,159,463
HEAT EXCHANGE APPARATUS
Filed March 24, 1936　　2 Sheets-Sheet 2

INVENTOR
JOSEPH T. VOORHEIS
BY James M. Abbett
ATTORNEY

Patented May 23, 1939

2,159,463

UNITED STATES PATENT OFFICE 2,159,463

HEAT EXCHANGE APPARATUS

Joseph T. Voorheis, Oakland, Calif.

Application March 24, 1936, Serial No. 70,632

2 Claims. (Cl. 257—108)

This invention relates to heat exchangers and the like.

In the operation of apparatus for the heating of liquids and particularly for the heating of various liquids under pressure where a high rate of heat transfer prevails, it often occurs that material in the fluid being heated will form a deposit on the heat exchange surfaces which will materially decrease the exchange efficiency of the apparatus. Often it is necessary to discontinue the use of pieces of heat exchange apparatus so that the parts can be cleaned. Conditions of this character often occur in dry cleaning plants where carbon tetrachloride is used as a cleaning fluid for garments. In this use the cleaning fluid after having served its intended purpose in cleaning the garments is transferred to a chamber containing steam coils where it is heated to a point of vaporization. This vapor then passes over into a condenser and after condensation the liquid is directed to a storage chamber where it is held ready for use again. In the piece of apparatus within which heating or vaporization of the liquid takes place the grease and/or foreign matter contained in the liquid collects on the surface of the steam heating coils, and eventually the surfaces of the coils accumulate a thick hard coating of baked grease and dirt, which it is necessary to remove in order to restore the heating coils to their original heat transference capacity.

A similar condition prevails in the operation of evaporators on steam ships which evaporators are used for evaporating salt water. In this instance a steam coil heats the salt water and the evaporated water passes to a condenser at a time the concentration reaches a certain stage. In other methods of heating salt water the salt water is heated with steam coils under a definite pressure, and is thereafter transferred to another piece of apparatus at a lower pressure, where evaporation and concentration takes place. In any event, however, it is only a matter of time until the steam coil becomes coated with a deposit of solid material which materially impairs the heat exchange efficiency and operation of the apparatus. In connection with the heating of commercial fuel oils, the heat exchange surface in contact with the oil eventually accumulates a deposit of carbonized hydrocarbons or a viscous coating of the free carbon particles contained in the cracked oil. This coating on the heating surface of the apparatus gradually retards heat transfer until it becomes necessary to clean these surfaces. With some oil heaters the cleaning can be accomplished by dismantling the apparatus, after which the surfaces are scraped. With straight tube oil heaters the tube can be brushed or swabbed and cleaned in some similar manner, but in the case of coil heaters where the oil accumulates on the surface within the tubes the cleaning operation must be accomplished by pumping fluids through the tubes or coil which have characteristics acting to dissolve or loosen the carbon coating occurring on the inside surfaces of the tube.

It is the principal object of the present invention to provide heat exchange apparatus which will operate more efficiently than heat exchange apparatus now used in that a greater rate of heat exchange may be obtained per unit of heat exchange surface in the present device as compared with structures for similar purposes now used.

It is another object of the present invention to provide a piece of heat exchange apparatus adapted for the various uses above designated and other similar uses, and which apparatus is so designed as to insure that the heat exchange surfaces in contact with fluids carrying the material which might deposit on such surfaces will be maintained free of deposit, thereby insuring that a maximum heat exchange efficiency of the apparatus may be obtained at all times, and without any necessity to shut down the plant or discontinue the use of the apparatus for the purposes of cleaning the parts of the device.

The present invention contemplates the provision of heat exchange apparatus which includes an outer shell, an inner tubular member through which fluid to be heated may be circulated, said tubular member and shell being of such relative diameter as to cause an annular fluid space to occur between them through which a fluid heating medium may circulate, the column of fluid to be heated having relative movement with relation to the tubular member, whereby the fluid to be heated may be maintained in motion with relation to the heat exchange surface and will due to this action prevent an accumulation of the solids which may be suspended within the fluid being heated, the apparatus also acting to produce a more efficient exchange of heat per unit of surface.

The invention is illustrated by way of example in the accompanying drawings in which:

Figure 1 is a view in central longitudinal section, showing one form of heat exchange apparatus with which the present invention is concerned.

Figure 2 is a view in transverse section through the heat exchanger as seen on the line 2—2 of Figure 1.

Figure 3 is an enlarged fragmentary view showing a rotor blade as used in the device.

Figure 4:
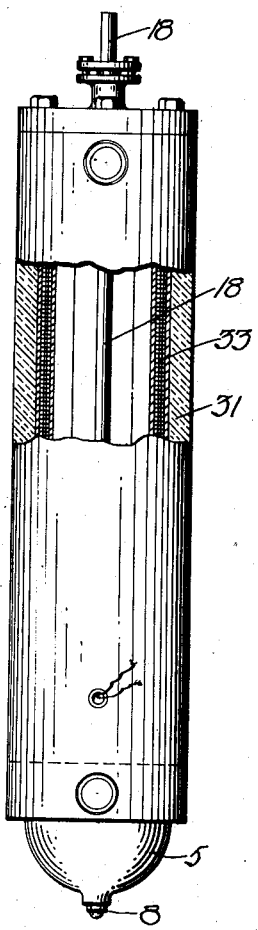
Figure 4 is a view in section and elevation showing a heat exchanger using an electric heating element.
Figure 5:
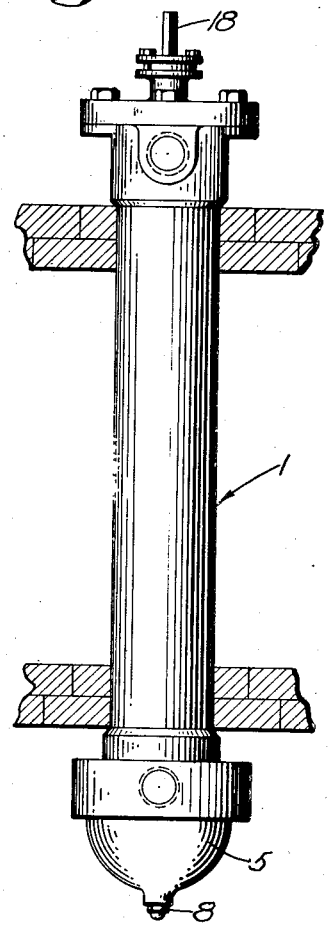
Figure 5 is a view in elevation showing another application of the present invention.
Figure 6:
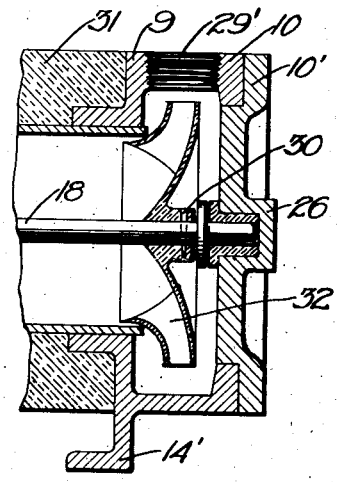
Figure 6 is a fragmentary view showing an end portion of the device provided with a centrifugal pump to impart additional pressure to the fluid circulating through the apparatus.

Referring more particularly to the drawings, 1 indicates a liquid heating tube through which liquid to be heated may flow longitudinally. Circumscribing the main portion of the heating tube is an outer shell 2 which is spaced from the heating tube to form an annular passageway 3 for a heating medium which circulates through this passageway. The heat from this medium is transferred from the exterior of the heating tube 1 to the fluid circulating within the tube 1 through the wall of the tube 1. It is to be understood that normally the heat exchanger is disposed with its longitudinal axis vertically. At the lower end of the heating tube 1 a lower head 4 is provided. This head is cylindrical, having a hub portion through which the lower end of the tube 1 extends and with which it snugly fits. As here shown the head 4 and the tube 1 are welded together. It is to be understood, however, that when desired these members may be otherwise secured together. The head 4 is formed with a circular end plate 4' which is spaced from the end portion of the head connected to the tube 1, and also spaced from the lower end of the tube. This end plate is formed with openings 5' through it to establish communication with a hemispherical dome member 5 into which sediment and solid material which have been suspended within the fluid may accumulate. A stud 6 is threaded at one end into the end plate 4' and passes through an opening centrally of the dome 5 where it receives a packing gasket 7 and a closed nut 8, by which the dome member 5 is firmly held in assembled position with relation to the lower head 4. Mounted at the opposite end of the heating tube 1 is an upper head 9. This head is formed with an annular hub appropriately fastened around the upper end of the heating tube 1, and provides a compartment 9' at the end of heating tube for a purpose to be hereinafter described. The outer end of the upper head is formed with an annular end plate 10' to which an upper head covering plate 10 is secured. A gasket 11 forms a tight seal between the portions 10 and 10'. The cover plate 10 is secured to the upper head by studs 12 and nuts 13. The upper head 9 is formed with a holding bracket 14 and the lower head 4 is formed with a similar holding bracket 14' by which the assembled heat exchanger structure may be secured in a desired operating position. The outer shell 2 is suitably fastened to the tube 1 at its opposite ends by welding or otherwise and thus forms a hermetically sealed annular space 3 for the heating medium. The heating medium, for example steam, is introduced to the heating space 3 through the wall of the outer shell 2 by an inlet pipe 15, here shown as positioned at a point substantially midway the length of the shell. The shell is provided with a pair of outlet pipes 16 here shown as at opposite ends of the shell, and preferably disposed on the diametrically opposite side of the shell from the inlet 15. The condensate may drain outwardly through the outlet connections 16. At the upper opened end of the heat tube 1 and within the compartment 9' a conical hood 17 is provided. This member flares outwardly and downwardly from a point of attachment with the upper head cover 10. The major circumferential end of the hood terminates in relatively close spaced relation to the upper end of the heating tube and is substantially of the same outside diameter as that of the inside diameter of the heating tube.

Extending longitudinally through the entire structure and centrally of the heating tube 1 is a rotor shaft 18. This shaft carries a plurality of transversely extending rotor shaft arms 19 which are fastened upon the shaft 18 in spaced relation to each other by set screws 19'. The outer ends of the radial arms 19 are split so as to form slots which extend in a plane extending centrally and extending longitudinally of the heating tube 1. These arms carry rotor blades 20, which are seated within the slots in the ends of the arms and are here shown as held by rivets 20'. The blades 20 are of a radial width greater than the depth of the slots within which they are mounted so that the outer edges of the blades project beyond the ends of the arms and terminate a short distance from the inner circumferential face of the heat tube 1. The edge of the blade 20 projecting outwardly from the arm is formed with a longitudinal slot 20" and receives a floating metal blade 21 which is of a radial width slightly less than the depth of the slot so that it may move outwardly and readily conform to the inner surface of the heating tube. The slot receiving the blade 21 is formed with a shoulder 21' adjacent its opposite ends to limit vertical movement of the blade. When the rotor structure is in operation the blades 21 are capable of movement outwardly from the slot relative to the inner wall of the vertical tube 1. Thus the floating blades 21 will produce a yieldable wiping or scraping action upon the inner circumferential face of the heat tube. Mounted upon the rotor shaft 18 at a point directly beneath the lower end of the heat tube 1 is an agitating disc 22 carrying radial blades 23 which have their major length extending transversely of the tube and have overhanging edges which pass over the lower end of the heating tube 1. The rotor shaft 18 is fitted at its lower end with a thrust collar 24 resting against a thrust bearing 25 within which bearing the lower end of the rotor shaft is supported. This bearing is carried within the hub 26 of the disc member 4' of the lower head 4. At the upper end of the rotor shaft another thrust collar 24 is provided acting against the thrust bearing 25 carried within the top cover plate 10. This cover plate is formed with a hub structure which receives a stuffing box gland 27 acting upon packing 28, which surrounds the upwardly projecting end of the rotor shaft. It will be understood that a suitable coupling or driving means may be attached to the upper end of the rotor shaft to provide driving power for its rotation.

Due to the fact that preferably the apparatus here shown is intended to stand vertically and that the heating medium enters at one side of the shell 2 and adjacent its center, the flow of fluid to be heated may be established optionally in either direction, that is to say it may be introduced to the upper head 9 through port 29, or through the lower head 4 through port 29'.

In some instances it may be desirable to increase the flow rate of the eduction fluid which has been heated and for that purpose the agitation plate 22 with its blades 23 are eliminated and a rotary centrifugal pump runner 32 is fastened on to the appropriate end of the rotary shaft by a pin 30. This runner receives the fluid which passes outwardly from the heat tube 1 and forces it through the eduction passageway 29'. With reference to Fig. 4 of the drawings, it will be seen that the outer shell 2 is not only covered with a thickness of heat insulating material but that also a heating element 33 surrounds the shell to impart heat in addition to that obtained by the fluid heating medium or as a substitute therefor.

Figure 7:
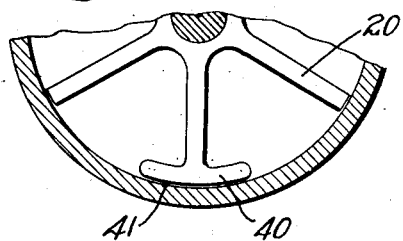
Figure 7 is a fragmentary view of another form of rotor.

By reference to Fig. 7 of the drawings the rotor is shown as having rigid blades 20 which have a small clearance space with the shell or may have a shoe 40 with clearance 41. It has been found in practice that when the apparatus is mounted with its longitudinal axis vertically the device will function more efficiently if the outer surface of the heat tube 1 is formed with a helical corrugation extending from one end of the tube to the other. This had been made for the purpose of eliminating any heat insulation action which might be produced by the accumulation of a film of condensate on the outer surface of the heat tube. It has been found by experiment that the helical groove extending longitudinally of the tube 1 will not only increase the heat exchange surface but will also act to take the entrained condensate and cause it to flow down the wall of the tube and along the groove so that it will gradually drain from the annular space 3 occurring between the tube 1 and the shell 2.

It is obvious that the present invention may be used in the heating of fluids which do not contain any matter forming an appreciable deposit on the surfaces of the parts and in such instances it is not necessary to provide the dome structure 5 at the lower end of the exchanger but to use a head substantially like that indicated at 9. In any event the heat exchange apparatus will operate with a high rate of heat exchange efficiency per unit of exchange surface.

In operation of the preferred form of the present invention the structure is assembled as particularly shown in Fig. 1 of the drawings where it will be seen that a fluid to be heated may be introduced into either the top or bottom head of the structure and that a heating medium may be introduced through the inlet pipe 15 and the condensation permitted to escape through pipe 16. Assuming for example that the fluid to be heated is introduced at the lower end of the apparatus it will be seen that this fluid passes into the lower head 4 through passageway 29' and that it then flows upwardly into the heat tube 1 filling the same and eventually overflowing at the upper end of the heat tube where it will pass out through the openings 29 in the head 9. It will be evident that when the device is functioning properly the heads 4 and 9 and the tube 1 will be filled with the fluid to be heated, thus producing a solid vertical column of this fluid, which is flowing upwardly at the rate of speed determined by the velocity at which the fluid is pumped or circulated through the apparatus. At the same time suitable driving means, such for example as an electric motor, or steam turbine, is connected to the rotor shaft 18 and drives the same at a selected speed of rotation. This in turn moves the blades 20 in a circular path of travel in close proximity to the inner cylindrical surface of the heat tubes. This action causes the entire fluid column to rotate within the heat tube 1 while it is at the same time moving upwardly. It is also pointed out that the blades tend to create a centrifugal force within the column of fluid so that the liquid in the column will force outwardly against the side wall of the tube and come in positive physical contact therewith, while it moves over the surface thereof. It will also be recognized that the blades 20, 21 or 40 will tend to squeeze a small film of the fluid in the column against the tube surface, and that due to this intimate contact and the rate of flow of the fluid over the inner face of the heat exchange surface a high degree of heat exchange is obtained and an action produced which prevents the accumulation of a coating of solid material on the surface. In fact it has been ascertained that the surface is thoroughly scoured by this action of the fluid traveling at high velocity.

As the fluid being heated contacts the heating surface of the tube 1 the molecules of the fluid will be heated and expanded and will decrease in density so that they will tend to migrate upwardly in the column. It will also be recognized that the density of the column will progressively increase toward the relatively cold fluid at the center of the column, and that due to this condition the centrifugal forces set up in the revolving column of fluid will act to move the heavier molecules outwardly to the edges of the column and to displace the lighter molecules which are moving upwardly, after having come into heat exchange relationship with the wall of the heat tube 1. It will thus be seen that due to this arrangement and this operation a maximum circulation of the fluid being heated will take place and the maximum exchange of heat will take place through the wall of the tube 1. It will also be seen that by the arrangement here shown the inner surface of the tube 1 will be maintained in a clean and burnished condition at all times, thus eliminating any objectionable heat insulating coating which might be deposited on the heat exchange surface and that furthermore the insulating effect of condensate accumulation upon the outer surface of the tube 1 will be eliminated.

It will thus be seen that the invention here disclosed provides a simple method and means of producing an efficient exchange of heat between two fluids and insurance that heat insulating deposits and films will not accumulate within the apparatus to impair the efficiency of the operation.

While I have shown the preferred form of my invention, as now known to me, it will be understood that various changes might be made in the combination, construction, and arrangement of parts by those skilled in the art, without departing from the spirit of the invention as claimed.

Having thus described my invention, what I claim and desire to secure by Letters Patent is:

1. A heat exchanger comprising a vertical tube adapted to be filled with a fluid and to have unrestricted flow longitudinally and downwardly therethrough, an outer shell in spaced relation to the tube and forming an intermediate compartment for a second fluid to be disposed in heat exchange relation to the first fluid, means for establishing circulation of the second fluid through the surrounding compartment, mechanical means disposed within the tube and having parts in close proximity to the inner circumferential face thereof, whereby the column of fluid within the tube may be rotated around the longitudinal axis of the tube as said mechanical means is rotated, and whereby the mechanical means will tend to bring the outer film of said column of fluid into intimate contact with the inner surface of the tube, blades carried by said means imparting motion to the column of fluid within the shell, and a reservoir at the bottom of the tube for entrapping sediment from said liquid.

2. A heat exchanger comprising a vertical tube of uniform diameter, walls providing passageways at the upper and lower end of said tube and through which fluid may flow to completely fill the tube and to maintain a column of liquid therein, walls providing a fluid compartment circumscribing the tube and through which a fluid may circulate in heat exchange relationship to said tube, a shaft extending through said tube, longitudinally extending blades carried by said shaft and extending substantially the entire length of the tube and being in relatively close proximity to the inner surface of the tube whereby the entire outer film of the column of fluid within the tube will be in intimate contact with said surface, and an impeller carried at the lower end of said shaft below said tube, said impeller comprising blades adapted for actuation so as to increase the flow rate of heated fluid through the tube, which includes a helical groove formed on the outer surface of the tube and having heat exchange relationship to the fluid in the shell, said groove extending continuously circumferentially of the tube so as to conduct the condensate to the lower end thereof.

JOSEPH T. VOORHEIS.